United States Patent [19]

Williams

[11] 3,769,593

[45] Oct. 30, 1973

[54] BATTERY CONSERVATION CIRCUIT

[75] Inventor: Ronald O. Williams, Chicago, Ill.

[73] Assignee: Stewart-Warner Corporation, Chicago, Ill.

[22] Filed: Mar. 8, 1972

[21] Appl. No.: 232,878

[52] U.S. Cl. .................. 325/492, 325/325, 328/258
[51] Int. Cl. .................. H04b 1/06
[58] Field of Search .................. 325/492, 493, 55, 325/64, 325; 328/258

[56] References Cited

UNITED STATES PATENTS

| | | | |
|---|---|---|---|
| 3,694,755 | 9/1972 | Ward | 325/492 |
| 3,665,313 | 5/1972 | Trent | 325/64 |
| 3,651,413 | 3/1972 | Wycoff | 325/432 |
| 2,912,574 | 11/1959 | Gensel | 325/492 |
| 2,884,518 | 4/1959 | O'Neil | 325/492 |
| 3,506,966 | 4/1970 | Magnuski | 325/55 |

*Primary Examiner*—Albert J. Mayer
*Attorney*—Augustus G. Douvas

[57] ABSTRACT

A battery conservation circuit for a selective paging receiver adapted to receive subscriber address-bearing code signals of a specific format comprises a timing circuit which periodically energizes the receiver for short periods of time to determine if valid address-bearing signals having the specific format are present. If such signals are present, the timer is latched in the on state and the receiver is continuously energized to permit decoding received addresses. When valid signals are no longer present, or when the amplitude of the reserved signal is too low for reliable operation, the timer circuit is unlatched after a predetermined time delay to resume the battery-saving cycle.

3 Claims, 3 Drawing Figures

BATTERY CONSERVATION CIRCUIT

BACKGROUND OF THE INVENTION

This invention pertains to selective paging receivers, and more particularly to an improved battery conservation circuit for use therein.

Selective paging systems have come into wide use for providing instantaneous communication with physicians, salesmen, repairmen and others whose work regularly takes them to locations where they may be out of contact with their offices for extended periods of time. With such systems it is only necessary that the subscriber carry on his person a radio receiver adapted to provide him with an audible alarm signal when an associated radio transmitter broadcasts a predetermined coded address signal. The subscriber then contacts his office by conventional communications means, e.g., public telephone, to ascertain the reason for which he is being paged.

By nature of their intended function it is necessary that the individual paging receivers of a selective paging system operate on their own internal batteries without recharging for extended periods of time. Yet, subscriber convenience dictates that the receiver be as physically small and lightweight as possible, severely limiting the size and capacity of internal batteries. Accordingly, paging receivers must be engineered with careful attention to battery drain requirements, and should preferably incorporate all feasible means for extending battery life. It is to one such means in the form of a battery conservation circuit that the present invention is directed.

One type of paging system which has proven successful is that wherein the subscriber address consists of a series of binary-coded pulses transmitted by narrowband frequency modulation (NBFM) techniques on an assigned frequency in the 148–174 megahertz band. Each receiver in the system contains appropriate logic circuitry for analyzing the pulses to determine if its particular subscriber is being paged, and if so for sounding an audible alarm. One particularly attractive scheme for analyzing the binary pulses is to generate within the receiver in time coincidence with the received address code a local series of pulses constituting the subscriber's address code, and then to compare the pulses on a bit-by-bit basis. It is in the environment of such a receiver that the present invention finds particular utility.

SUMMARY OF THE INVENTION

Accordingly, it is an object of the present invention to provide a new and improved circuit for conserving battery energy in a selective paging receiver.

It is a more specific object of the present invention to provide a new and improved battery conservation circuit for prolonging battery life in a selective paging receiver.

In accordance with the invention, a selective paging receiver of the type adapted to recognize and respond to subscriber address-bearing signals of a predetermined format, incorporates a battery conservation circuit comprising timing means for periodically rendering the paging receiver operative for a predetermined period of time to enable the presence of subscriber address signals of the predetermined format to be determined. Recognition means are provided for recognizing the receipt of address-bearing signals of the predetermined format, as are means for maintaining the receiv er operative during and for a predetermined time following recognition of signals of the predetermined format by the recognition means.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
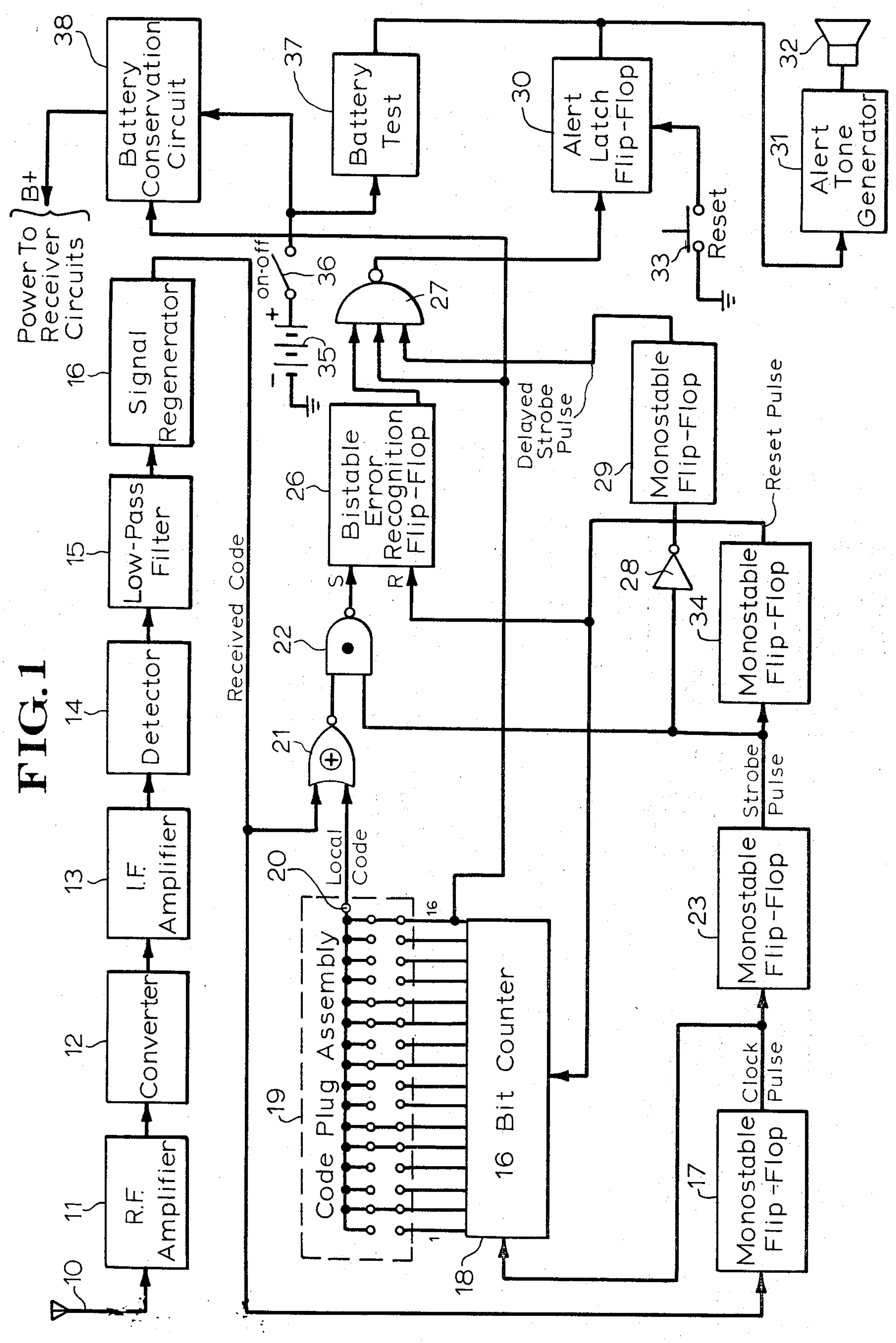
FIG. 1 is a block diagram of a receiver for a selective paging system embodying the present invention.

The battery conservation circuit of the invention is shown in the embodiment of a VHF NBFM single-conversion super-heterodyne paging receiver of the type adapted to receive and analyze subscriber addresses in the form of a series of binary coded pulses. Before considering the inventive circuit in detail it is desirable to have a general working knowledge of this receiver as a whole, and to this end a preferred receiver is depicted in block diagram form in FIG. 1.

A received signal in the 148–174 MHz band is intercepted by an antenna 10, amplified by a radio-frequency (RF) amplifier 11, and converted to an intermediate-frequency by a converter 12. These stages, aside from considerations of miniaturization and low current drain, are conventional in design and may employ one or more tuned circuits to provide necessary selectivity for rejecting adjacent channel transmissions. The resulting intermediate-frequency (IF) signal, which may in practice be centered at 7 KHz, is applied to an IF amplifier stage 13. This stage preferably comprises a plurality of amplifier stages and tuned filters to obtain a desired bandpass characteristic for accommodating the frequency shifts of the received address code signals. A preferred construction for this stage is covered in detail in the concurrently filed copending application of Joseph F. Yello, Ser. No. 232,881, which is also assigned to the present assignee.

The amplified intermediate-frequency output of IF amplifier 13 is applied to an FM detector 14, which in its simplest form may comprise a diode detector for converting the received binary coded signal into a digital signal comprising a sequence of high and low DC voltage levels. This signal is then applied to a 180 Hz low-pass filter 15 to prevent noise and extraneous non-address code-bearing signals from affecting the digital decoding process. Filter 15 in its simplest form may comprise a single RC filter network and one stage of compensating amplification.

To improve system reliability and performance, the digital signal from filter 15 is applied to a novel signal regenerator stage 16 wherein the varying DC voltage levels from detector 14 are optimally shaped and amplitude-equalized for reliable analysis by the address-recognition logic circuitry of the receiver. This stage, which automatically maintains a uniform code pulse width even in the face of signal amplitudes falling below the limiting threshold of IF amplifier 13, contributes much to the operational reliability of the receiver and is fully covered in the concurrently filed copending application of the present inventor, Ser. No. 232,882, also assigned to the present assignee.

The processed address code signal from signal regenerator 16 is coupled to the decoder portion of the receiver wherein it is analyzed to determined whether it is intended for that particular receiver. As previously mentioned, this analysis is accomplished by generating an internal address code in time coincidence with the received address code, and then comparing the two on a bit-by-bit basis. If the addresses are identical, the receiver alert tone is sounded.

While the exact code format is somewhat arbitrary, we will assume for the sake of discussion that the address format consists of 16 bits each comprising a time slot of approximately 10 milliseconds. Allowing 90 milliseconds reset period between addresses, it follows that 250 milliseconds or 0.25 seconds will be required for each full address, and that four addresses may be sent per second. If one of the 16 bits is reserved for parity checking, i.e., having the total number of high or low bits always add up to an odd or even number for transmission monitoring purposes, and if it is desired to have a hamming distance of two, i.e., each address at least two bits different from any other address, the 16 bit format yields 32,768 valid address codes.

Figure 2:
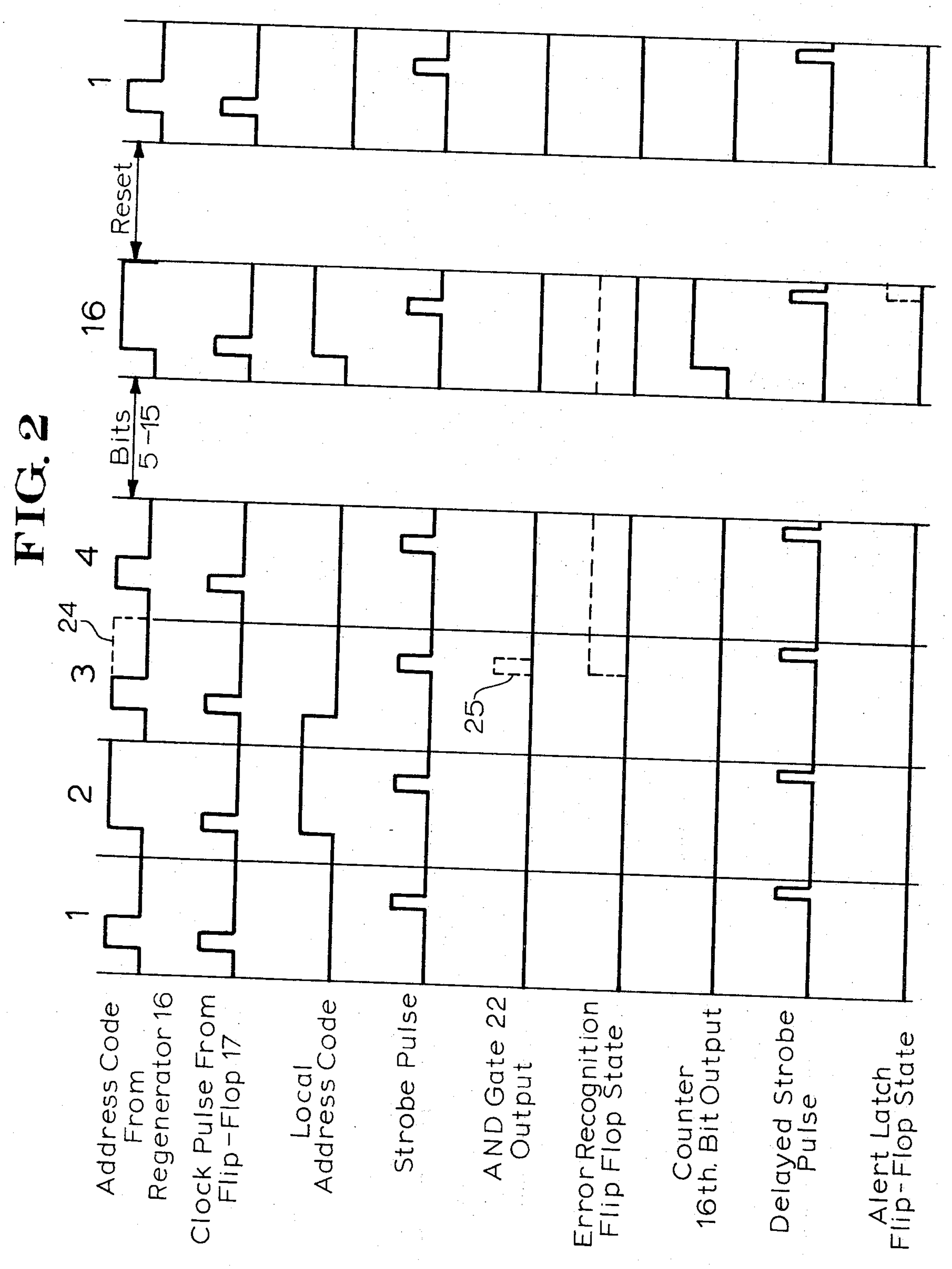
FIG. 2 is a graphical presentation of signal waveforms useful in understanding the operation of the receiver of FIG. 1.

Referring to FIG. 2, each of the 16 bits in the address code may be thought of as divided into four equal portions. In a valid address the first portion of each bit is always transmitted as a low and the second portion always transmitted as a high. This transition between low and high is recognized as a clock pulse by the decoding circuitry, and is used to synchronize the locally generated address with the received address. Specifically, in FIG. 1 the received address code is applied to a monostable flip-flop 17, which responds to the low to high transition to produce a clock pulse. The first four bits and the 16th bit of a representative address code as it would appear at the output of signal regenerator 16 is shown as the first trace, and the clock pulse output of flip-flop 17 as the second trace in FIG. 2.

The clock pulses from flip-flop 17 are applied to the input of a 16 bit counter 18. This counter has 16 output terminals which are cyclically rendered high, one at a time, as the counter advances from a reset or one count to a final or 16 count. The 16 output terminals are connected to respective ones of 16 terminals on a code plug assembly 19, which is arranged to connect selected ones of the terminals to a common output terminal 20. Thus, depending on which of the counter outputs are connected to terminal 20, a high-low address code is generated on terminal 20 as the counter is advancd from 1 through 16 by the clock pulses from flip-flop 17. This is seen in the third trace of FIG. 2.

The locally generated address code at terminal 20 is applied to one input of a two input exclusive OR logic element 21, and the received address code from signal regenerator 16 is applied to the other input. As is well known to the art, logic elements such as exclusive OR gate 21 have two distinct operating states which may be defined in terms of high and low voltage conditions, a high voltage condition being approximately the reference or supply voltage, generally in the order of 5.0 volts for the most common logic elements, and a low being some value less than reference, generally near or equal to 0 volts or ground potential. Exclusive OR gate 21 assumes a high state only when its two inputs do not agree, i.e., one is high and the other is low. Otherwise it exists in a low state, producing an appropriate low output signal. This is put to advantage in the present instance to compare the received and local address codes on a bit-by-bit basis, producing an output only when the two codes do not agree.

To prevent minor timing irregularities in the received and locally generated signals from causing erroneous address comparisons, the comparison process is restricted to a short period of time at the mid-point of the data portion of each bit, i.e., between the third and fourth portions of the bit. To this end, the output of exclusive OR gate 21 is connected to one input of a two-input AND gate 22, the other input of which is connected to a source of strobe pulses occurring between the third and fourth portions of each address bit. Since AND gate 22 can assume a high state only when neither one of its inputs is low, and a positive-polarity strobe pulse is necessary on its second input to fulfill this condition, bit-by-bit comparison in exclusive OR gate 21 is effectively prevented from having any effect except during the strobe pulse. The strobe pulse is generated by a monostable flip-flop 23, which is triggered by the clock pulse from flip-flop 17 and is arranged to provide the necessary delay of approximately one-half time slot between the clock pulse and the mid-point of the data.

As can be seen in the fourth and fifth traces of FIG. 2, there is no disagreement in the present example and thus no output from AND gate 22. However, the first trace in FIG. 2 includes an alternate high state for its fourth bit, as indicated by the broken line 24. Had this signal been transmitted instead, the received address code would not have agreed with the locally generated address code, and a strobe-coincident output pulse would have been generated at the output of AND gate 22, as shown by the dotted line 25.

Should an output pulse be produced by gate 22 at any time during the 16 bits of the address, a bistable error recognition flip-flop 26 is actuated from its normal or reset state to its set state. The output of this flip-flop, high only in the reset state, is applied to one input of a three input logical AND gate 27. Another one of the inputs to this gate is connected to the 16th count output of counter 18, and the remaining input is coupled to flip-flop 23 through a delay network comprising an inverter 28 and a monostable flip-flop 29. The latter connections prevent an output from AND gate 27 except when counter 18 is in its 16th or final counting state, and the 16th bit strobe pulse from flip-flop 23 has occurred. Inverter 28 and flip-flop 29 delay the strobe pulse applied to gate 27 sufficiently to insure that the local and received 16th bit code pulse will have been compared prior to recognition of an error.

When flip-flop 26 is in its reset state (i.e., no comparison error between the address codes), counter 18 is in its 16th or final counting state, and the strobe pulse for the 16th address bit has occurred, the output of AND gate 27 becomes high and forces an alert latch flip-flop 30 to transition to its latched state. This causes current to be supplied to an alert tone generator 31, which causes an alert tone in an associated loudspeaker 32. A reset switch 33 is provided to allow the subscriber to reset flip-flop 30 after receiving the alert.

If the local and received address codes do not agree, flip-flop 26 is actuated, AND gate 27 is inhibited, and an alert is not sounded. In any event, approximately 40 milliseconds after the last address code bit a retriggerable monostable flip-flop 34 returns to its low state, and in so doing resets counter 18 and error recognition flip-flop 26 during the 90 millisecond reset period between code addresses.

Operating power for the receiver is provided by a battery 35, which is preferably a compact rechargeable type such as nickel-cadmium. The negative battery terminal is grounded, and the positive terminal is connected by means of a single-pole, single-throw power switch 36 to a battery test circuit 37, and to the various receiver circuits by a battery conservation circuit 38, to which the present invention is directed.

In accordance with the invention, battery conservation circuit 38 functions to periodically cycle the receiver on and off pending receipt and recognition of valid 16 bit address codes. Upon receipt of a valid address, the on-off cycle ceases and the receiver is maintained in a constant on state to permit normal reception of address codes. When valid address codes are no longer received, the conservation circuit reverts back to an on-off cycle after a short time delay. Since the on portion of the cycle is in practice only approximately 1 second long, and the off cycle approximately 9 seconds long, the savings in battery energy is substantial. No change in the system address code format is necessary, except that approximately 9 seconds of dummy addresses will be transmitted prior to an initial transmission of a valid code to insure that all receivers will be on and prepared to sound an alarm.

Figure 3:
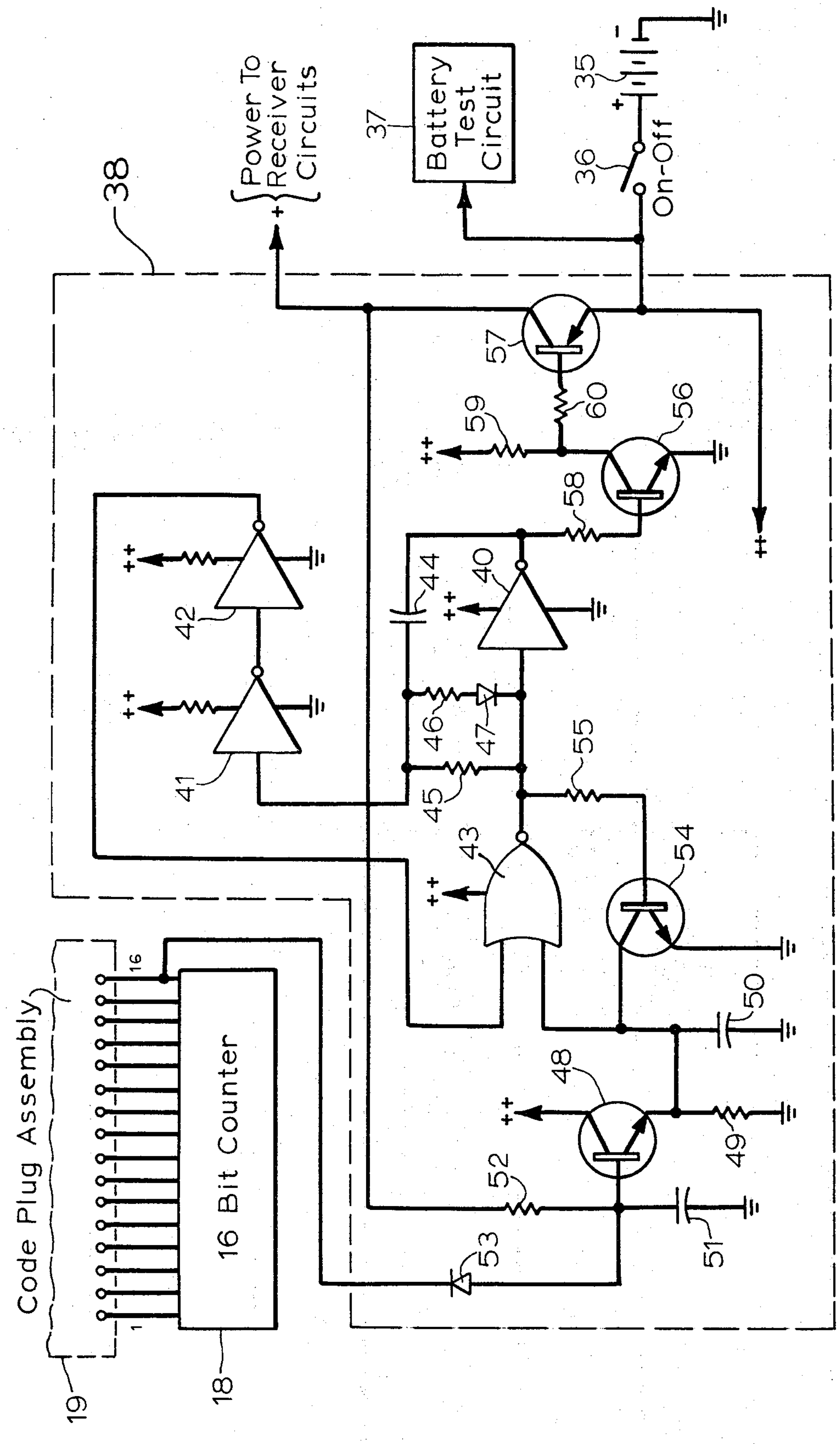
FIG. 3 is a schematic diagram of a battery conservation circuit constructed in accordance with the invention.

Referring now to the detailed schematic of the battery conservation circuit in FIG. 3, the circuit is seen to incorporate a multivibrator-type circuit comprising three inverter-amplifiers 40-42, and a two-input positive NOR logic gate 43. The output of inverter 40 is connected by the series combination of a capacitor 44 and a resistor 45 to the output of logic gate 43, which is also connected to the input of inverter 40. Resistor 45 is shunted by the series combination of a resistor 46 and a diode 47 to provide different charge and discharge time constants for capacitor 44. The juncture of capacitor 44 and resistor 45 is connected to the input of inverter 41. The output of this device is connected directly to the input of inverter 42, and the output of inverter 42 is connected to one input of positive NOR gate 43. As will presently be explained, the aforedescribed connections serve to establish within battery conservation circuit 38 a form of astable free-running multivibrator which produces a control signal for periodically energizing the paging receiver to determine the presence of valid subscriber address-bearing code. signals.

Recognition means in the form of an NPN transistor 48 and associated circuitry are provided for latching the multivibrator in its on mode in the presence of a valid signal. The remaining input of gate 43 is connected to the emitter of transistor 48, which is connected to ground by the parallel combination of a resistor 49 and a capacitor 50. The base of transistor 48 is connected to ground by a capacitor 51, and to switched receiver B+ by a resistor 52. The base of transistor 48 is also connected to the 16th bit output of counter 18 by a diode 53, the latter connection serving as means for recognizing the presence of a valid, i.e., 16 bit, address-bearing code signal.

Another NPN transistor 54 is provided to speed the transition between high and low states for gate 43. Specifically, the base of transistor 54 is connected to the output of gate 53 by a resistor 55, the emitter is connected directly to ground, and the collector is connected to the emitter of transistor 48. The exact manner of operation of the circuit will be explained presently.

Switching means in the form of an NPN transistor 56 and a PNP transistor 47 and their associated circuitry are provided to utilize the operating state of the multivibrator to control the receiver. The output of inverter 40 is coupled to the base of transistor 56 by a resistor 58, the emitter is grounded and the collector is connected to unswitched battery B+ by a collector load resistor 59. The collector of transistor 56 is connected to the base of transistor 57 by a resistor 60. The collector of transistor 57 is connected to the receiver B+ bus and the emitter is connected to the receiver battery through the receiver power switch 36. A battery B+ bus (++) is also provided for powering the individual components of the battery conservation circuit, which must necessarily be powered at all times the master switch is on.

In operation, the input of inverter 40 is initially low and the output is initially high, coinciding with the beginning of the receiver on cycle. This causes capacitor 44 to charge through resistors 45 and 46, the diode being forward-biased in the direction of current flow. Resistor 46 is selected to assure that the capacitor will charge vary rapidly, in the present case in approximately one second. During this time the voltage level at the input of inverter 41 is the algebraic sum of the so-called low voltage level at the input of inverter 40 and the voltage drop produced by the flow of charging current through resistors 45 and 46. As the capacitor reaches full charge, current flow through these two resistors ceases, and the voltage at the input of inverter 41 falls, driving its output higher. This voltage change is again amplified and inverted by inverter 42, producing a very rapid shift towards a low voltage state on the associated input of positive NOR logic gate 43. Eventually the voltage falls below the input threshold of gate 43, causing that device to change state from high to low, and thereby bring about the end of the receiver on cycle and the beginning of the battery-saving off cycle.

With either one or both of its inputs low, the output of positive NOR logic circuit gate 43 is necessarily high and the output of inverter 40 necessarily low. Capacitor 44 now begins to discharge, the output of inverter 40 acting as a current sink and the output of gate 53 as a current source. Because diode 47 is now reverse-biased, and resistor 45 has a relatively high resistance, the rate of discharge is relatively slow, in practice about 9 seconds. The direction of current flow through resistor 45 is such that the voltage drop thereacross is negative with respect to the so-called high voltage level at the output of gate 43. This assures that the net voltage appearing at the input of inverter 41 will not be immediately sufficiently high even after amplification in inverters 41 and 52 to switch positive NOR logic gate 43 to its low state. However, as capacitor 44 discharges the current through resistor 45 eventually decays to a point where the amplified voltage swing from inverters 41 and 42 rises above the associated input threshold of gate 43, causing that device to change its output state from high to low.

This begins the on portion of the cycle anew, since the output of inverter 40 is now high and capacitor 44 is now charging through resistors 45 and 46. Whenever the output of inverter 40 is high, transistor 56 is rendered conductive through resistor 58. This causes an increased voltage drop across collector load resistor 59, and conduction in transistor 57 by virtue of base coupling resistor 60. Only when transistor 57 is conductive can current flow from battery 35 to the receiver circuits, limiting battery drain to the relatively short duration on periods of the multivibrator circuit.

It still remains to latch the receiver in its on mode during receipt of valid address codes. To this end the base of transistor 48 is connected to the 16th bit output of counter 18 through diode 53 so that the transistor will be conductive only after a 16-bit address has been received. Specifically, the output is low at all times except when counter 18 is in its 16th bit counting position. While low this output acts as a current sink, effectively shunting capacitor 51 and preventing that component from being charged through resistor 52. When the 16th bit output is high, diode 53 is reverse-biased and capacitor 52 charges through resistor 52. The time constant is sufficiently long, in the order of 20 milliseconds, to insure that the counter must actually come to rest on the 16th count following receipt of a valid address code, as opposed to merely passing through that count while responding to an extraneous signal.

Transistor 48 functions as an emitter-follower, causing capacitor 50 to charge simultaneously with capacitor 51. This effects a so-called high voltage level on the associated input of positive NOR logic gate 43, forcing the output of that element low and effectively latching the multivibrator circuit in its on state. As long as 16 bit address codes continue to be received, transistor 48 periodically maintains the charge on capacitor 50 at a substantially constant level. However, when valid address codes are no longer present capacitor 50 gradually discharges through resistor 49 and the voltage on the associated input of gate 43 falls to zero. Eventually it falls below the threshold level, allowing the multivibrator to resume its free-running on-off cycle. In practice the discharge time constant is chosen to provide that the multivibrator will return to a free-running mode following the absence of four valid address codes. Thus, should one, two or three codes be missed because of interference or poor transmission, the receiver will remain on for receipt of a possible subsequent address code.

Transistor 54 is provided to assure a sharp transition between on and off modes. Specifically, when capacitor 50 has discharged to the point where the output of gate 43 starts the transition to a low state, transistor 54 conducts to immediately complete the discharge of capacitor 50. This sharpens the transition between the two states and prevents a possible bi-stable on-off condition in the multivibrator.

Thus, a novel battery conservation circuit has been shown which automatically cycles the receiver on and off pending receipt of a valid address code. When such a code is received, the circuit maintains the receiver in an on state for as long as valid address codes continue to be received. When the address codes cease to be received, either because transmissions have ceased or the signal level has fallen below that required for reliable stepping of counter 18, the battery conservation circuit returns to an on-off battery-conserving cycle after a predetermined time delay. The result is a significant increase in battery life since the receiver is only powered for 1 second in 10, and yet is automatically available for the receipt of valid code transmissions.

The circuit is compact and economical to construct, making maximum use of modern integrated circuit technology. It is engineered to provide minimum current drain and to make maximum use of existing circuitry and components within the receiver.

While a particular embodiment of the invention has been shown and described, it will be obvious to those skilled in the art that changes and modifications may be made without departing from the invention in its broader aspects. Accordingly, the aim of the appended claims is to cover all such changes and modifications as may fall within the true spirit and scope of the invention.

I claim:

1. In a portable selective paging receiver of the type operated by an internal battery for detecting a cyclically repeated subscriber address-bearing signal of a predetermined format, a battery conservation circuit comprising;

a first inverter amplifier having input and output terminals;

means connected to the output terminal of said first amplifier for rendering said battery effective to operate said receiver for detecting said subscriber signal only in response to said first amplifier providing one output signal and rendering said battery ineffective to operate said receiver in response to said amplifier providing another output signal;

a logic gate having a pair of input terminals and an output terminal coupled to the input terminal of said first inverter amplifier for providing one control signal for controlling said first amplifier to provide said one output signal only in response to one predetermined input signal applied to either one or both of said gate input terminals and providing another control signal for controlling said first amplifier to provide said other output signal in response to another predetermined input signal applied to both said gate input terminals;

second inverter amplifier means having input and output means with said second amplifier means output means coupled to one input terminal of said logic gate for providing either said one or other predetermined input signals to said gate one input terminal;

a capacitor connected between said first amplifier output terminal and said second inverter amplifier input means with said first amplifier supplying said capacitor with a respective reference voltage corresponding respectively to said one and other first amplifier output signal;

a pair of parallel resistors with one of said resistors being of low value relative the other resistor and having a unidirectional circuit element in series therewith to charge said capacitor in one direction through said one resistor and unidirectional element against one reference voltage in a relatively short time period in response to said logic gate providing said one control signal to said first amplifier whereby said second amplifier is controlled to terminate said one predetermined input signal and apply said other input signal to terminate said gate one control signal and operation of said receiver whereafter said gate other control signal charges said capacitor in the opposite direction through the other resistor of said pair against another reference voltage in a relatively long period whereby said second amplifier is controlled to terminate said other input signal and apply said one input signal for providing said gate one control signal to render said battery effective to operate said receiver;

a transistor having a base circuit and an emitter circuit connected to the other input terminal of said logic gate;

an RC circuit including a resistor and series capacitor connected across said battery with the junction of said RC circuit serially connected resistor and capacitor connected to said base circuit;

a counter producing a control signal of a predetermined direction in response to each detection of said address-bearing signal of said predetermined format during the period said battery is effective to operate said receiver;

a unidirectional circuit element biased in one direction connected to the juncture of said RC circuit serially connected resistor and capacitor to prevent the charging of said capacitor and hold said transistor nonconductive and biased in the reverse direction in response to the production of said counter control signal of predetermined direction to enable said RC circuit capacitor to charge to a value for rendering said transistor conductive to provide said one predetermined input signal to said gate other input terminal;

and means rendered effective in response to the conduction of said transistor for maintaining said one predetermined input signal at said gate other input terminal for a last period longer than the cyclic repetition of said address-bearing signal to control said first amplifier to render said battery effective to operate said receiver for said last period.

2. The conservation circuit claimed in claim 1 in which said means rendered effective to maintain said one predetermined input signal at said gate other input terminal comprises a last capacitor connected to said transistor emitter circuit and said gate other input terminal and charged in one direction in response to conduction by said transistor, and a resistor providing a discharge path for said last capacitor during said last period.

3. In the conservation circuit claimed in claim 2 a last transistor having a collector circuit connected to said gate other input terminal and having a base circuit connected to the output terminal of said gate whereby said last transistor is rendered effective to rapidly discharge said last capacitor in response to the initiation of a shift in the output of said logic gate.

* * * * *